UNITED STATES PATENT OFFICE.

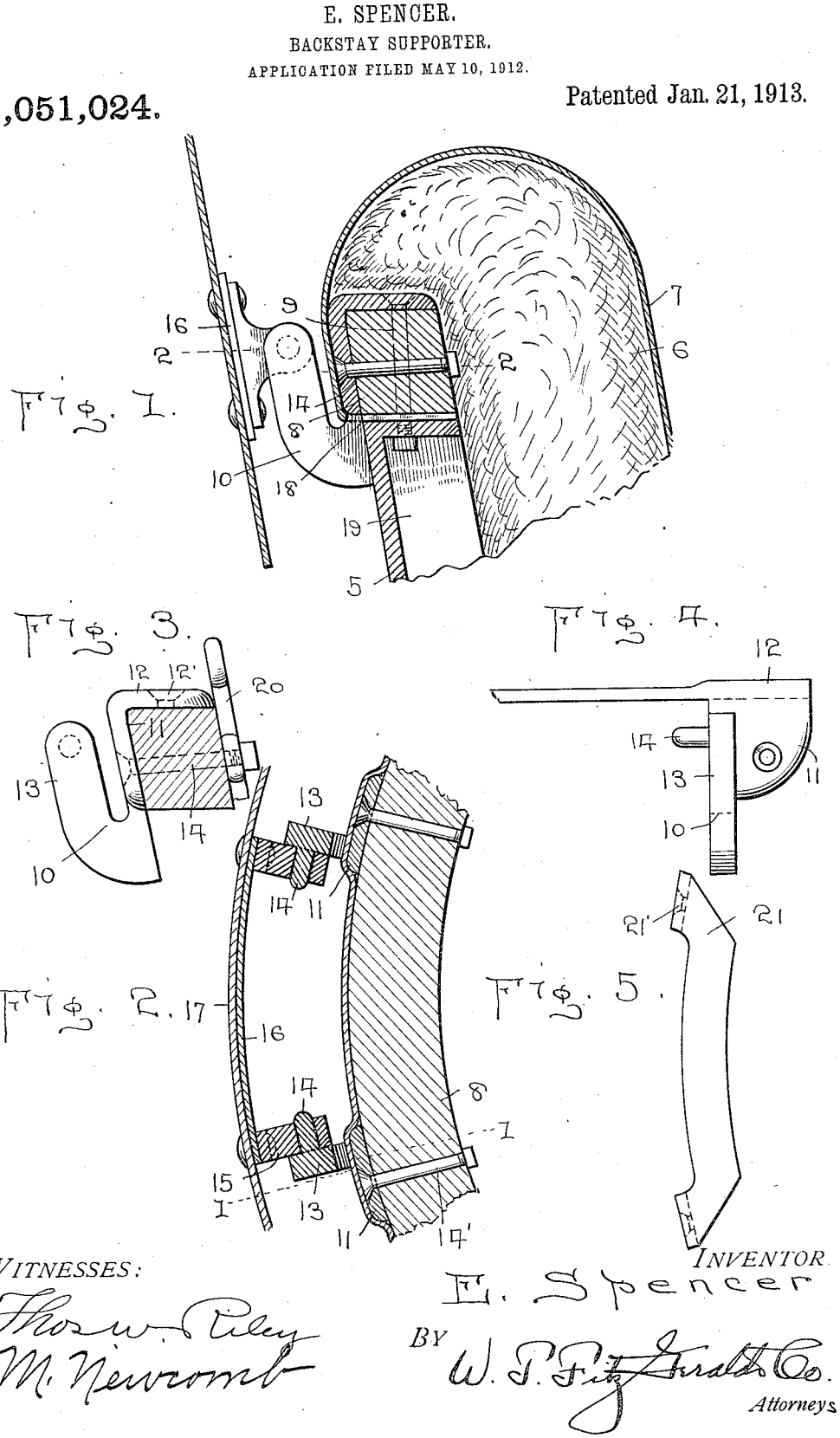

EDWARD SPENCER, OF WINDSOR, ONTARIO, CANADA.

BACKSTAY-SUPPORTER.

1,051,024.

Specification of Letters Patent.

Patented Jan. 21, 1913.

Application filed May 10, 1912. Serial No. 696,537.

*To all whom it may concern:*

Be it known that I, EDWARD SPENCER, a citizen of Canada, residing at Windsor, in the Province of Ontario and Dominion of Canada, have invented certain new and useful Improvements in Backstay-Supporters; and I do hereby declare the following to be a full, clear, and exact description of the invention, such as will enable others skilled in the art to which it appertains to make and use the same.

This invention relates to automobile fittings, and it more particularly relates to a back stay support or bracket, designed to be secured to the back of an automobile seat.

In automobiles of ordinary construction, where the upholstering is applied directly to the seat-back and where the back-seat is also supported by the seat-back, it has been found difficult to quickly and neatly fit the upholstery covering around the back-seat supports.

Therefore, an object of the invention is to provide an improved back-seat support or bracket, whereby the foregoing disadvantages are avoided, and whereby said upholstery covering may be so applied so as to hide the heads of screws or bolts by which the bracket is secured.

A still further object of the invention is to provide a supporting bracket of this character, the securing means of which also operates to secure the back-rail to the back standards, while also coacting therewith for securely clamping the upholstery covering in place.

Other objects and advantages may be recited hereinafter and in the claim.

In the accompanying drawings which form a part of this application, Figure 1 is a fragmental vertical sectional view through the back-rail, standard and upholstery of an automobile seat, taken on line 1—1 of Fig. 2, and having my improved supporting bracket applied thereto. Fig. 2 is a sectional view taken on the line 2—2 of Fig. 1. Fig. 3 is an end view of the supporting bracket, Fig. 4 is a rear view of a portion of the bracket, and, Fig. 5 is a plan view of a slightly modified form of supporting bracket of this character.

Referring more particularly to the drawings, in which similar reference characters designate corresponding parts throughout the several views, the back standard or main support of an automobile seat-back is designated 5, the upholstery filling being designated 6 and the upholstery covering 7. A top rail 8 is secured on the back standard by means of a screw-bolt 9, said screw bolt also serving as securing means for my improved supporting bracket 10; said supporting bracket consisting of substantially vertical plates 11 and a substantially horizontal plate 12 integrally united with each other and with substantially vertical supporting arms 13, said arms being spaced apart from each other and having their major portion spaced apart from the substantially vertical plates. The plates 11 are apertured for the reception of bolts 14, which extend laterally through the top rail or trim rail 8, and auxiliate the securing means already described. The arms 13 are provided with studs 14' which engage suitable apertures through a pair of stay brackets 15, said stay brackets being connected to a flat spring 16 and to a back curtain or the like 17. The covering 7 is slotted at 18, and the slotted portion passes around the part of the bracket 10 where the plate 11 and the arm 13 unite, extending thence between the top of the back standard and the bottom of the top rail, being clamped in this position by means of the screw bolts 9. It will be seen that the slot 18 is entirely hidden by the plates 11 and the trim rail, and is securely clamped in this hidden position.

In applying this improved supporting bracket, the trim rail is placed in position upon the back standards, said standards (only one of which is shown) being recessed at 19 for the reception of suitable panels or the like (not shown). The supporting bracket is then placed upon the trim rail, and the bolts 9 are loosely inserted, and the upholstery covering is thereafter slitted and inserted under said rail, as shown; else, the supporting bracket is first secured to the trim rail, by means of the bolts 14, whereupon, the covering may be slitted and fitted in place around the brackets, and secured by means of tacks, or the like, at its inner edge. The trim rail and cover may then be seated in place on the standards 19, and the screw bolt 9 may then be inserted, and the trim rail and back standards may therewith constitute a clamp for holding the upholstery covering securely in place. The upholstery filling 6 may then be applied, whereupon the upholstery covering may be drawn thereover and have its bottom edge secured by any proper means (not shown). It will be seen, therefore, that the top of the automobile seat-back will be smoothly, neatly and durably upholstered, while the greater portion of the supporting bracket and all of the securing members are hidden by the upholstery.

As shown in Fig. 3, the bolt 14 may serve the double purpose of securing my improved bracket and the top frame-supporting bracket 20 in place on the trim rail. It will also be seen, by referring to Figs. 3 and 5, that I may dispense with the bolt 9, and may employ any other proper means (not shown) for securing the trim rail onto the standard or back member 19. When the bolts 9 are dispensed with, I prefer to use the slightly modified form of bracket illustrated in Fig. 5, in which the top plate 21 corresponds with the top 12 in Figs. 3 and 4, except that in this modified form the top plate is imperforate, whereas the apertures 12′ are provided through the top plate 12. Apertures 21′ are, however, provided for receiving the bolts 14, as in the other figures.

Obviously, I have provided a supporting bracket of this character, whereby the foregoing objects are attained in a thoroughly practical and efficient manner.

I do not limit my invention to the exact details of construction, combination and arrangement of parts as herewith described and illustrated, but my invention may only be limited by a reasonable interpretation of the following claim.

What I claim is:

The combination in an upholstered seat-back, of a back standard, a substantially horizontal top rail on the standard, and an article supporting bracket comprising a horizontal plate and a substantially vertical plate fitted to the top and back of the top rail and having a supporting arm extending rearward and upward from said substantially vertical plate and having its upper portion spaced apart therefrom so as to receive a portion of the upholstery covering, the edge of the covering contiguous to said arm being slitted and fitted around the base of the arm and securely clamped between the top rail and the standard.

In testimony whereof I have signed my name to this specification in the presence of two subscribing witnesses.

EDWARD SPENCER.

Witnesses:
MARY M. NEIL,
JAMES ROLAND GREENWOOD.

---

Copies of this patent may be obtained for five cents each, by addressing the "Commissioner of Patents, Washington, D. C."